(12) United States Patent
Chu et al.

(10) Patent No.: US 11,449,154 B1
(45) Date of Patent: Sep. 20, 2022

(54) MULTI-DIMENSIONAL CONTROLLER APPARATUS

(71) Applicant: Grant & Union Inc., Kitchener (CA)

(72) Inventors: Calvin Chu, Kitchner (CA); Sirui Wang, Mississauga (CA); Zhan Yong Qi, Kitchener (CA); Andrew Joseph John Hayes, Kitchener (CA); Ioan Romulus Curticapean, Markham (CA)

(73) Assignee: GRANT & UNION INC., Kitchener (CA)

( * ) Notice: Subject to any disclaimer, the term of this patent is extended or adjusted under 35 U.S.C. 154(b) by 0 days.

(21) Appl. No.: 17/023,330

(22) Filed: Sep. 16, 2020

(51) Int. Cl.
*G06F 3/0346* (2013.01)
*G06F 3/044* (2006.01)

(52) U.S. Cl.
CPC ............ *G06F 3/0346* (2013.01); *G06F 3/044* (2013.01)

(58) Field of Classification Search
CPC ................. G06F 3/0346; G06F 3/044
See application file for complete search history.

(56) References Cited

U.S. PATENT DOCUMENTS

| 2010/0265176 | A1* | 10/2010 | Olsson | G05G 9/047 345/161 |
| 2012/0256821 | A1* | 10/2012 | Olsson | G06F 3/0338 345/156 |
| 2018/0166235 | A1* | 6/2018 | Merminod | G06F 3/021 |
| 2018/0298959 | A1* | 10/2018 | Battlogg | F16D 57/002 |

* cited by examiner

*Primary Examiner* — Peter D McLoone
(74) *Attorney, Agent, or Firm* — Tai W. Nahm; Nahm IP Law

(57) ABSTRACT

There is disclosed a multi-dimensional user interface controller apparatus for providing a multi-dimensional user input. In an embodiment, the apparatus comprises a disc adapted to be tilted to control at least two-axes, and depressible in a third axis, and an outer ring surrounding the disc, the outer ring adapted to rotate about the disc to control a fourth axis. In use, the disc and the outer ring are controllable to provide at least four-axes of simultaneous control inputs. In an embodiment, the multi-dimensional user interface controller apparatus further comprises a plurality of magnetic sensors to sense the tilt of the disc or a press on the disc. In another embodiment, the disc further comprises a touch-sensitive top surface adapted to sense one or more fingers touching the surface.

20 Claims, 8 Drawing Sheets

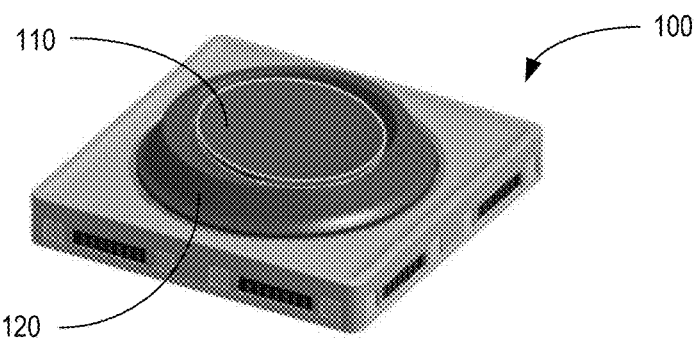
FIG. 1
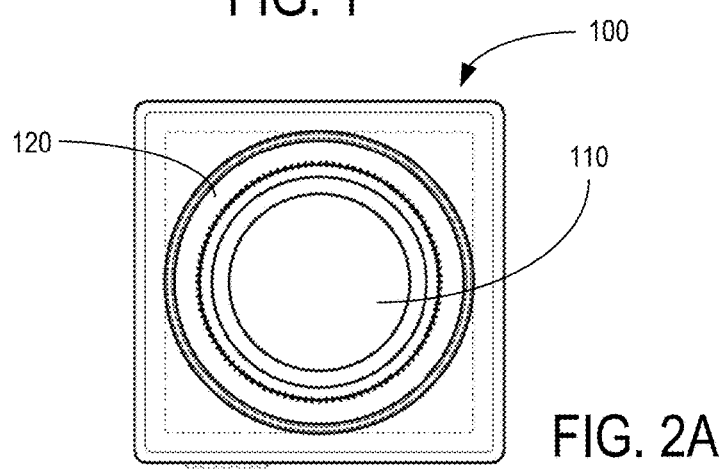
FIG. 2A
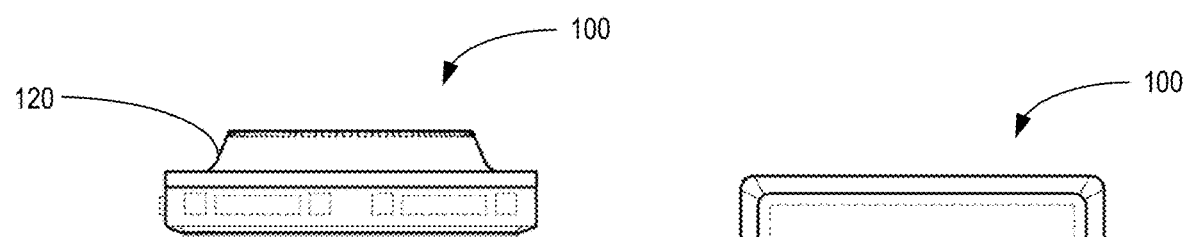
FIG. 2B
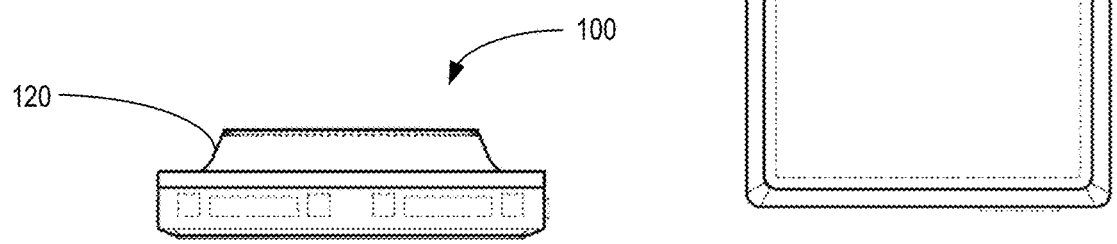
FIG. 2C
FIG. 2D

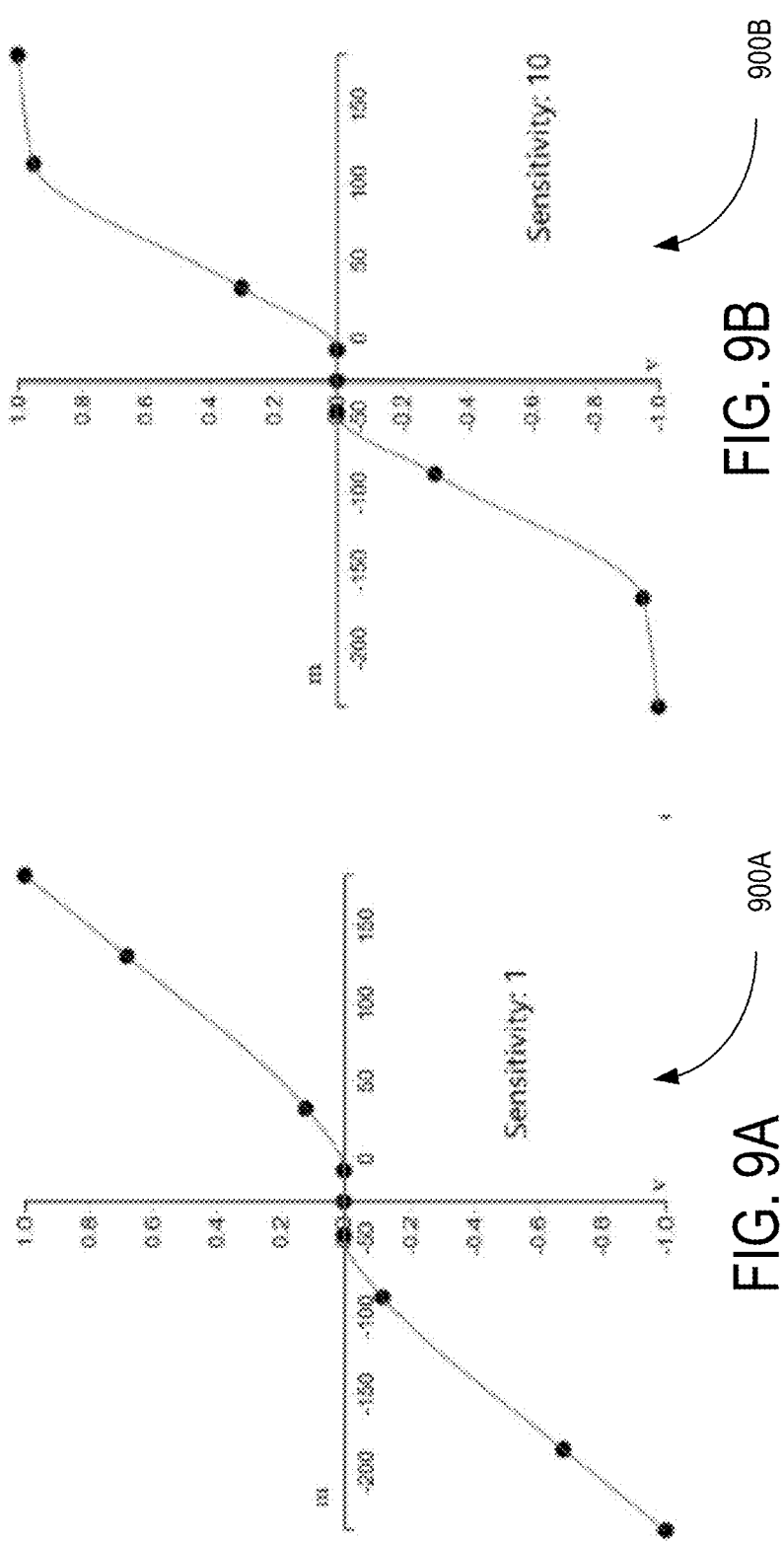

MULTI-DIMENSIONAL CONTROLLER APPARATUS

FIELD OF THE INVENTION

The present disclosure relates generally to user interfaces, and more particularly to a multi-dimensional controller apparatus.

BACKGROUND

Existing solutions for multi-dimensional user interface controllers have some inherent limitations and disadvantages. For example, trackballs are prone to dust and debris, and may be cumbersome to carry. Joysticks may require a sideways motion which can cause the device to tip, even with fastening means such as suction cups. More elaborate multi-dimensional controllers may have 6-axes of control, but having too many axes is difficult to control, especially where motion in just one axis is desired, such as an upwards pull motion.

Therefore, what is needed is an improved user interface controller apparatus which addresses at least some of the above limitations.

SUMMARY

The present disclosure relates generally to an ergonomic, multi-dimensional controller which allows accurate control in multiple dimensions.

In an embodiment, the proposed design comprises a disc and outer ring form factor allowing control of multiple axes, including: Disc Tilt X, Disc Tilt Y, Disc Press Z, and Ring Rotate.

In an embodiment, the disc is pressure/tilt/touch sensitive as sensed by a magnetic sensor, and is actuated by a downwards press of a finger for 2 or 3-axis of control.

In another embodiment, an outer ring surrounding the circumference of the disc provides an additional axis control.

In another embodiment, the disc and outer ring may be used simultaneously or independently while maintaining a comfortable hand position.

In another embodiment, various gestures and function mapping may be generated based on a combination of disc/ring movements (e.g. press up on disc while turning clockwise on ring, etc.)

In another embodiment, an additional capacitive multi-touch element may be provided on the top surface of the disc for sensing of one-finger or multi-finger gestures (e.g. tap, long tap, swipe, pinch, rotate, etc.).

In another embodiment, the disc stiffness is tuned so it does not deflect on touch gestures but deflects on press/tilt gestures.

Advantageously, the present controller apparatus facilitates accurate control in multiple axes by allowing a user to utilize various input gestures using one of the disc or outer ring, or a combination of both.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present apparatus, and objects of the invention will become apparent, when consideration is given to the following detailed description thereof. Such description makes reference to the annexed drawings, wherein:

FIG. 1 shows an isometric view of a multi-dimensional user interface controller apparatus in accordance with an embodiment, in which a disc is depressed on one side.

FIGS. 2A-2D show line drawings of the multi-dimensional user interface controller apparatus of FIG. 1.

FIGS. 9A and 9B show an illustrative graph of mapping sensitivity changes to the shape of a curve in accordance with an embodiment.

Figure 3A:
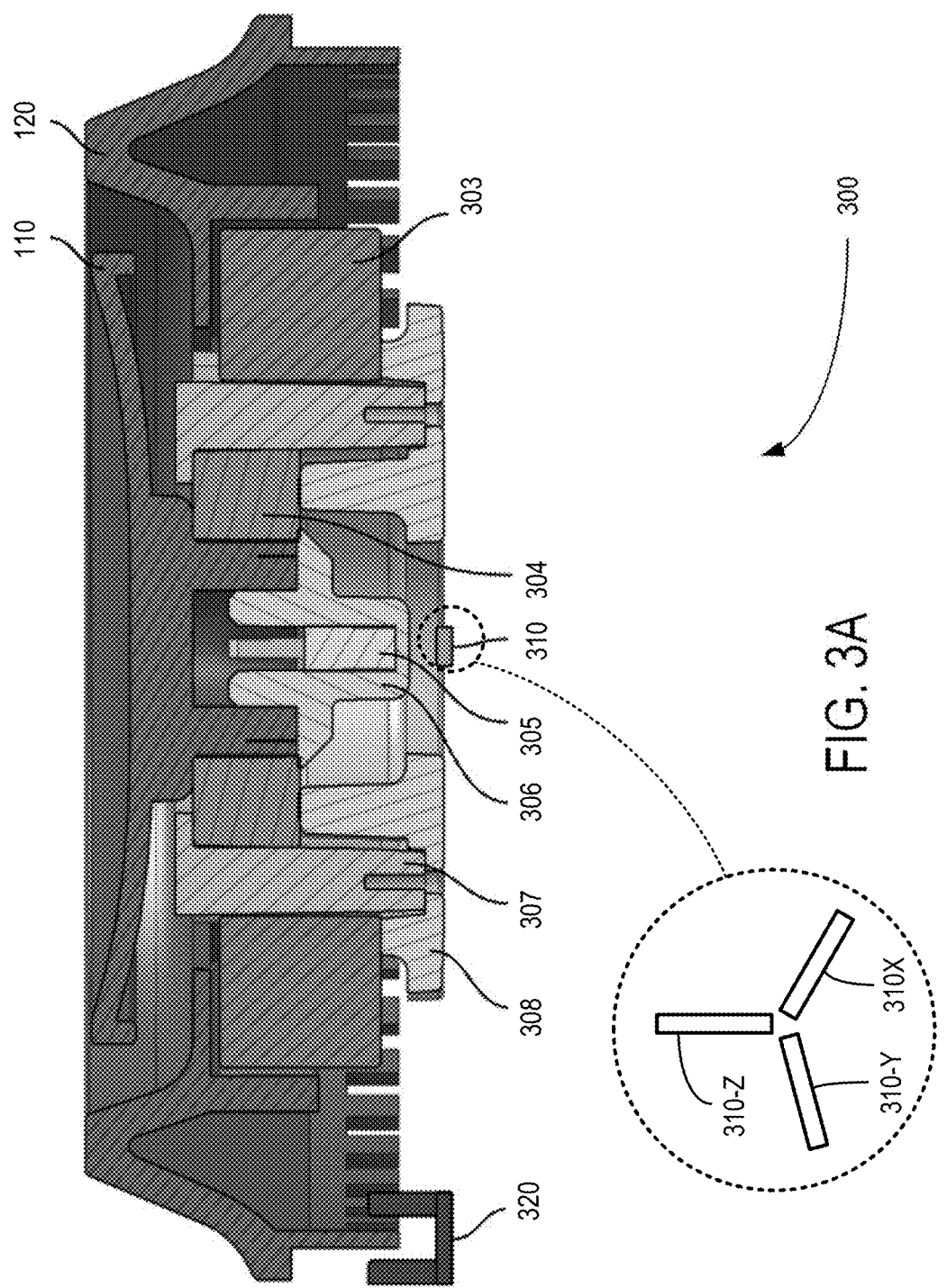
FIG. 3A shows a cross-sectional view of the multi-dimensional user interface controller apparatus of FIGS. 1 and 2A-2D.

In the drawings, embodiments are illustrated by way of example. It is to be expressly understood that the description and drawings are only for the purpose of illustration and as an aid to understanding, and are not intended as describing the accurate performance and behavior of the embodiments and a definition of the limits of the invention.

DETAILED DESCRIPTION

As noted above, the present disclosure relates to an ergonomic, multi-dimensional controller which allows accurate control in multiple dimensions.

In an embodiment, the proposed design comprises a disc and outer ring form factor allowing control of multiple axes, including: Disc Tilt X, Disc Tilt Y, Disc Press Z, and Ring Rotate.

In an embodiment, the disc is pressure/tilt/touch sensitive as sensed by a magnetic sensor, and is actuated by a downwards press of one or more fingers for 2 or 3-axis of control.

In another embodiment, an outer ring surrounding the circumference of the disc provides an additional axis control.

In another embodiment, the disc and outer ring may be used simultaneously or independently while maintaining comfortable hand position.

In another embodiment, various gestures and function mapping may be generated based on combination of disc/ring movements (e.g. press up on disc while turning clockwise on ring, etc.)

In another embodiment, an additional capacitive multi-touch element may be provided on the top surface of the disc for sensing of one-finger or multi-finger gestures (e.g. tap, long tap, swipe, pinch, rotate, etc.).

In another embodiment, the disc stiffness is tuned so it does not deflect on touch gestures but deflects on press/tilt gestures.

Advantageously, the present controller apparatus facilitates accurate control in multiple axes by allowing a user to utilize various input gestures using one of the disc or outer ring, or a combination of both.

Illustrative embodiments will now be described with reference to the drawings.

FIG. 1 shows an isometric view of a multi-dimensional user interface controller apparatus 100 in accordance with an embodiment, in which a disc 110 is depressed on one side. As discussed in further detail below, the disc 100 is configured to tilt at least on X- and Y-axis in all directions (Disc Tilt X, Disc Tilt Y). Disc 100 is also depressible (Disc Press Z) to actuate or initiate a programmed action. An outer ring 120 encircles or surrounds the outer circumference of the disc 110, and may rotate (Ring Rotate) about the disc 110. Thus the outer ring 120 may be used as another axis of input in addition to the disc 110 to pr0.ovide at least four axes or four dimensions of input (i.e. Disc Tilt X, Disc Tilt Y, and Disc Press Z).

FIGS. 2A-2D show corresponding line drawings of the multi-dimensional user interface controller apparatus of FIG. 1.

FIG. 3A shows a cross-sectional view of a controller portion 300 of the multi-dimensional user interface controller apparatus 100 of FIG. 1. In this illustrative embodiment, the disc 110 and outer ring 120 are shown in cross-section at the top of the controller portion 300, which further includes bearings 303 to enable rotation of the ring 120. The controller portion 300 further includes a grommet piece 304 which in this illustrative embodiment is an elastomer component (shown isolated in FIG. 4) for allowing the disc 110 to tilt in any direction, and to return to an upright center position. Still referring to FIG. 3, in an embodiment, a permanent magnet 305 is embedded or affixed by a magnet holder 305 to a stem of the disc 100. The assembly may be mounted on an upper chassis 307, and also seated on a lower chassis 308.

In use, the disc 110 can be tilted in all directions within the interior diameter of rotational ring 120. The disc 110 is attached to the grommet piece 304 which is a compliant elastomer or spring-like device which allows for a tilting rotation about the X and Y axis and translation along the Z axis. One or more magnetic Hall Effect sensors 310 which may be positioned proximate the permanent magnet 305 may detect the magnetic field strength resulting from movement of the disc 110.

In an embodiment, three Hall Effect sensors 310 are mounted perpendicularly with respect to each other, one for each of the X/Y/Z axes (310-X, 310-Y, 310-Z). The permanent magnet 305 embedded in or affixed to the stem of the disc 110 creates the magnetic field that is detected by the three Hall Effect sensors 310. While Hall Effect sensors 310 are preferred, possible alternatives include strain gauges, optical sensors, potentiometers, inductive position sensors, magneto resistive sensors, or vision-based systems may be used for input detection instead.

In a preferred embodiment, the stem length of the disc 110 is designed to mechanically amplify the tilt of the disc 110, and is contactless such that it does not cause friction to encumber motion, such as would be the case with a carbon strip potentiometer commonly found in joysticks.

Figure 3B:
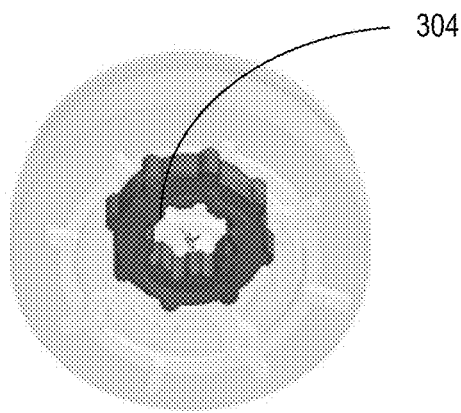
FIG. 3B shows an isometric view of a grommet part in accordance with an embodiment.

Now referring to FIG. 3B, shown is an isometric view of a part which may be made of an elastomer spring in accordance with an embodiment. In a preferred embodiment, the elastomer material properties provide both spring and damping response due to its ability to deform in all directions, challenges in controlling its behavior to achieve desired performance: twisting, lifting, elasticity/return. Furthermore, the elastomer spring should be retained such that the disc 110 can return to its resting position while also preventing unintentional motion such as twisting and slipping which would lead to erroneous position readings. Unintentional twisting can be reduced by incorporating splines and keyways into the geometry of the elastomer spring and the mating geometry of the disc 110 stem and chassis. Further, the magnet may also be mounted with repeatable concentricity and air gap from the Hall Effect sensor 310 so a specially designed magnet holder and spring pre-compression is maintained. In an embodiment, a mechanical chassis and clip are designed to restrict movement in z-direction to improve spring back behavior. In an embodiment, the durometer or hardness of the material is designed for user tactility and spring/damping behavior, and is also designed for manufacturing considerations.

In an embodiment, the apparatus is designed to translate raw sensor position data into useful input. A non-linear transfer function implementation has been found to result in better user experience and control, such as a monotonic cubic spline or a Lagrange polynomial. These may be converted to either Cartesian or polar coordinates depending on the application. In an embodiment, an algorithm to bias the transfer function is utilized so that the controller position "sticks" to X or Y axes and intelligently negates diagonal drift based on user intention. This behavior aids the user in exclusive control of one dimension on the disc 110 without affecting the other.

In another embodiment, the apparatus undergoes self-calibration, including a center dead zone and maximum range in different directions.

This module output may then be further processed to convert the controller inputs to useful functionality within a third party software application.

Figure 5:
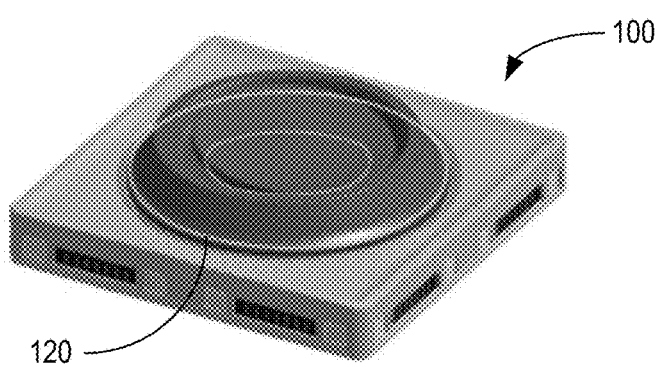
FIG. 5 shows an isometric view of the multi-dimensional user interface controller apparatus, showing the outer ring portion.

FIG. 5 shows an isometric view of the multi-dimensional user interface controller apparatus, showing the outer ring portion. This outer ring 120 is an independent control of another axis, and may comprise an optical sensor 320 having infrared diodes using quadrature encoding. This ring 120 with coding "teeth" distributed along the edge is mounted on a bearing and surrounds the disc assembly. In an embodiment, a Schmitt trigger electrical signal conditioning may be utilized to stabilize the encoder pulses. These encoder signals are then decoded by the microcontroller and combined with the sensor inputs of the disc 110 to allow for simultaneous operation.

In another embodiment, the ring 120 contains haptic feedback motors which vibrate at varied intensities at pre-defined step values. Various waveforms can be fired on the ring 120 to provide users with tactile feedback as the ring 120 is being turned.

In another embodiment, the ring 120 can be pushed down vertically to provide an additional binary actuation motion. The haptic feedback may be utilized to indicate outcome of the target application actuation (success/failure).

In another embodiment, the ring 120 may contain a user-selectable default position. Through the use of an electric motor or mechanical springs or other mechanisms, the ring 120 may return autonomously to the default position upon disengagement of the user's finger on the ring 120. The disc 110 is a linear control input which outputs an absolute position value with a default position zero degrees of tilt in all directions and zero units of press in Z. The device driver receives the controller input and triggers a user-defined action on the user's target application. The user-defined action could be a change in one or more of the target app's working variables, execution of a custom function/routine in the target application, any other features enabled by the Application Programming Interface of the target application, or a combination of any or all of the above.

There are three methods by which the user will vary their physical input when interacting with the disc 110:
  Direction
  Pressure
  Duration Direction: Varying the direction of input on the disc 110 varies which output(s) are sent. Assuming trackball-like mapping: if the direction of input is not a perfect multiple of 90°, two outputs will be sent with the ratio of X:Y equaling cot θ where θ=angle of input.

For example, applying pressure at 450 or 225° angles will produce a perfect 1:1 ratio of X:Y adjustments.

Pressure: Varying the pressure of input on the disc 110 varies the total output.

For example, increasing the pressure on the disc 110 will either:
  A) Increase the rate of output (for relative step actions)
  B) Increase the amplitude of output (for absolute set actions)

Duration: When assigned to modify a target application variable and that variable has a predefined range corresponding to the travel range of the disc 110 (absolute set actions), the disc 110 sends an absolute value as its output. This value may change over time with modulations in pressure.

When assigned to the rate of change of a target application variable (relative step actions), the disc 110 sends a continuous stream of step changes (delta) while pressed. The amount of pressure modulates the rate at which these step changes are sent.

It is possible that the target application variable contains time as its unit (such as velocity) or that variable controls a time-variant system. In this case, the disc 110 should behave identically to the relative step actions control mode described above.

The disc 110 can behave in three modes:
  Omni-directional mode
  Priority-directional mode
  Lone-directional mode Now referring to FIG. 4A, in Omni-directional mode, the effective action on the target app is uniform regardless of angle of actuation. The angle at which the disc 110 tilts varies the ratio between its two axes of adjustment, with X:Y equal to cot θ. Disc pressure is analogous to pressure applied on a vehicle's accelerator pedal. This input variable is combined with time to reach the final adjustment in the target software. The disc 110 is equally pressure-sensitive in all directions, and modulates its output using pressure x duration similarly to how a trackball uses speed x duration.

In priority-directional mode, each axis corresponds to a single, discrete, 1-dimensional adjustment. For example, tilt X changes saturation and tilt Y changes contrast of a photo in a target application which is a photo editor. Now referring to FIG. 4B, a version of priority-directional mode diminishes off-axis pressure sensitivity (see shorter arrows at 30° and 60°). The disc 110 is more sensitive along the axes than off-axis. In this mode, the target application actuation can either diminish off or snap to the nearest axis, when the pressure applied to the disc 110 is off-axis. Note that it is very difficult for the human finger to apply pressure at precise 0, 90, 180, and 270 degrees on-axis. The priority-directional mode enables some amount of blending between the axes, and also precise control of a single axis by the user.

Figure 4A:
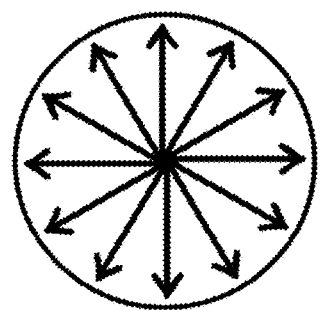
FIGS. 4A-4D shows various possible modes of the disc input.
Figure 4B:
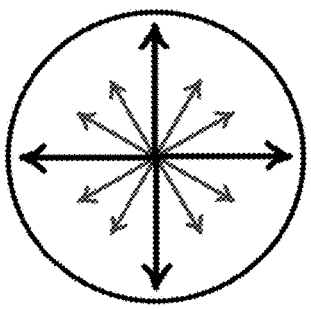
Figure 4C:
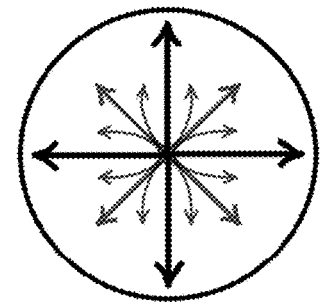

Now referring to FIG. 4C, an alternative implementation of priority-directional mode "snaps" slightly off-axis presses to conform to the X or Y axis (see smallest arrows), while still allowing strongly off-axis presses (see arrows at 45°)

Figure 4D:
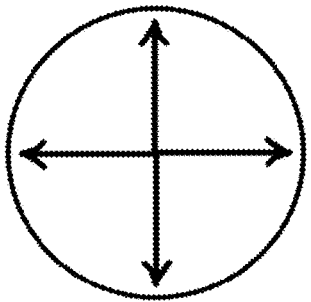

Now referring to FIG. 4D, in a lone-directional mode, the disc 110 behaves like a D-pad. D-pads are mechanically fixed to X and Y axes, there is little to no ability to apply input at a diagonal.

A D-Pad is completely unambiguous as to the direction of input that is applied or the corresponding output to be expected. D-Pads do not allow the user to vary input pressure, they are a binary on/off switch for each direction. A D-Pad is completely unambiguous as to its state and when it has crossed from the off to on state. The disc 110 can act as a D-pad by enforcing no blending between the X and Y axes, and only trigger target application action when a specified threshold of pressure has reached. In this mode, the magnitude of the actuation is not considered, so target application receives a binary on/off actuation event representing the axis and polarity of the actuation only.

In an embodiment, the difference in the three disc behavior modes listed above can be considered simply as "Bias":
  Bias=0: Omni-directional mode, trackball alternative style
  Bias=50: Priority-directional or "Fluid style", allows for precise control of one of the two axis, or both at the same time. Reduced diagonal response. Alternative to two 1-dimensional controllers.
  Bias=100: Lone-directional mode or "D-Pad style". Similar to Bias=50, but only one axis is allowed to output at a time, and the other axis is suppressed.

Bias values are not limited to the three listed above. It is a continuous unitless value defined with a range of 0 to 100 inclusively.

The combination of the disc 110 and the outer ring 120 may be used to provide controller inputs in multiple axes and dimensions. Here are some illustrative examples:
  1-Dimensional Control
  Target application: video editing. Action: ring equivalent jogwheel/dial
  Target application: video editing. Action: timeline forward/reverse
  Target application: photo editing. Action: contrast increment/decrement
  disc equivalent to slider
  audio: pitch up/down
  aircraft simulation: throttle up/down
  disc equivalent to dial
  photo: contrast increment/decrement
  2-Dimensional Control
  disc equivalent to joystick (absolute value)
  disc equivalent to trackball (relative/incremental value)
  3-Dimensional Control 3D control: disc of X/Y position, ring for Z position
3D control: disc of pitch/roll rotation, ring for yaw rotation
4-Dimensional Control
Target application: video editing Color Grading. Action: disc tilt X/Y position to move cursor within a color wheel, ring for brightness, Disc Z push down to reset color wheel cursor position
Target application: Digital audio workstation (DAW)—Music Production. Action: disc tilt X/Y are assigned to MIDI Continuous Control instruments with target DAW, and disc Z push down to trigger a MIDI note with velocity, ring for pitch bend adjustments FIG. 5 shows a schematic overview of a process for calibrating and processing the signals from the multi-dimensional user interface controller apparatus in accordance with an embodiment.

Table A below shows an illustrative example of sampling and converting the controller signal to a scaled value and then further to an actuation on the target application.

'n'>'stepMin' conditions are met. In an embodiment, the message may be sent at the same rate, but the amounts sent may vary.

In an embodiment, the controller may be configured to process a step change value action on the target application by a user input into the outer ring 120 and/or the disc 110. In an embodiment, the speed of step change action may be used to provide a resulting variable input:

Step_change_value=∫orbiter_value dt
Step_changeaction_value is executed on the target application at fixed rate (10 ms/20 ms/etc. . . . )
Aggregate/accumulate if:
Step_change is smaller than 'stepMin'
Step_change is more frequent than 'freqMax'

In an embodiment, tilting the disc 110 changes relevant target application values up or down. The relationship between the force applied on the disc 110 (i.e. tilt of disc) and the effect on the app may be calibrated by defining sensitivity, and by how fast and how much of an action is applied by a user (e.g. a nudging action). The step change

TABLE A

| Sample Rate | Exponential Moving Average on acquired samples | Magnetic Field to Scaled Value | Scaled Value to equivalent perceived impact on target application |
|---|---|---|---|
| New measurement is read from the Sensor every ~10 ms | 'm_raw' and 'm_eavg': Measured magnetic field strength Signed 12 bit. 1 bit is equivalent to 0.98 mT.<br><br>$\alpha = 0.1$<br><br>m_eavg[t] = $\alpha$ * m_raw + (1 − $\alpha$)m_eavg[t − 1]<br><br>Each n is ~10 ms apart<br><br>The exponential average 'm_eavg' is reported to the Core<br><br>Note: For simplicity we treat 'm' as integer, since we only care about the difference in magnetic field and not the absolute value | Define a function v = f(m) where m is the data as measured by sensor, v is the scaled value to the range of the sensor as [−1, +1], and f(m) as the interpolation/mapping function.<br><br>'v' should correspond to the perceived physical effort expended to tilt the disc.<br><br>The mapping function varies depending on user-selected sensitivity<br><br>When the disc is at its center and neutral position, 'm' is die center point ("calibration"). | Define a function n = g(v, r) where n is the variable to change for the target app, v is the scaled value, and r is the actuation rate.<br><br>When 'n' is a target application variable and that variable has a predefined range corresponding to the travel range of the disc (absolute set actions), the function 'g( )' is executed whenever the sensor reports a new measurement 'm' and a 'v' is produced from 'f(m)'.<br><br>When 'n' is the rate of change of a target application variable, The function 'g( )' is executed every 'r' seconds to produce a step change value of 'n' for the target app dependent on the 'v' from the disc. This function enables velocity control of parameters. A typical value for 'r' could be 10 ms or 100 Hz. |

In an embodiment, the controller software determines a minimum step value 'stepMin' that the target application can accept. Once this is determined, step values may be accumulated to provide a step signal or command acceptable to the target app.

In an embodiment, the controller software determines a maximum value for actuation rate 'r' that the target application can accept. This value is called 'freqMax'. Once this is determined, step values may be accumulated to provide a step signal or command at a rate acceptable to the target app.

In an embodiment, a task exists to fire off events. For example, the task may run at intervals defined by actuation rate 'r'. The task ensures that 'r'>'freqMax' and shall correspond the user-applied finger pressure on the disc 110 to a reasonable perceived impact on the target application. For example, the rate of timeline scrub in a video-editing application should correlate to the amount of force the user applies on the disc 110. A light force corresponds to a slow movement on the timeline, and heavy force corresponds to fast yet still controllable movement along the timeline.

In an illustrative implementation, a function v=f(m) is defined where m is the data as measured by sensor, v is the scaled value to the range of the sensor as [−1, +1], and f(m) as the interpolation/mapping function.

In an embodiment, the measurements from the Hall Effect sensors 310 are in Teslas, which is related to the tilt of the disc 110 relative to each sensor. The tilt of the disc 110 is caused by a user's finger or fingers applying force counteracted by the durometer.

Here, m is chosen instead of B for magnetic field strength because the result of this research should be relevant as a matter of human perception of relative forces applied by the finger(s) on the disc 110, regardless of sensor choice. However, with that said, m is the same as B for this particular case. (B is always m, but m is not always B.)

In an illustrative example, the following points are defined as shown in Table B below.

TABLE B

| Symbol | Name | m | v |
|---|---|---|---|
| n1 | Absolute Min | Extreme pressure applied on Negative side | −1 |
| n2 | Negative pickup point | Finger resting on the Negative side of disk | 0 |
| n3 | Centre Point | Elastomer in neutral position, no force applied | 0 |
| n4 | Positive pickup point | Finger resting on Positive side of disk | 0 |
| n5 | Absolute Max | Extreme pressure applied on Positive side | +1 |

With an elastomer of durometer 10A to 40A on the Shore A hardness scale, and the magnetic field strength sensor, the typical value of n3−n2=8 and n4−n3=8 is observed. The area between n2 and n4 is the "dead zone".

By way of example, using a 3-degree polynomial interpolation for f(m), it is monotone as long as n2 to n4 is monotone (ignore n3).

Figure 6:
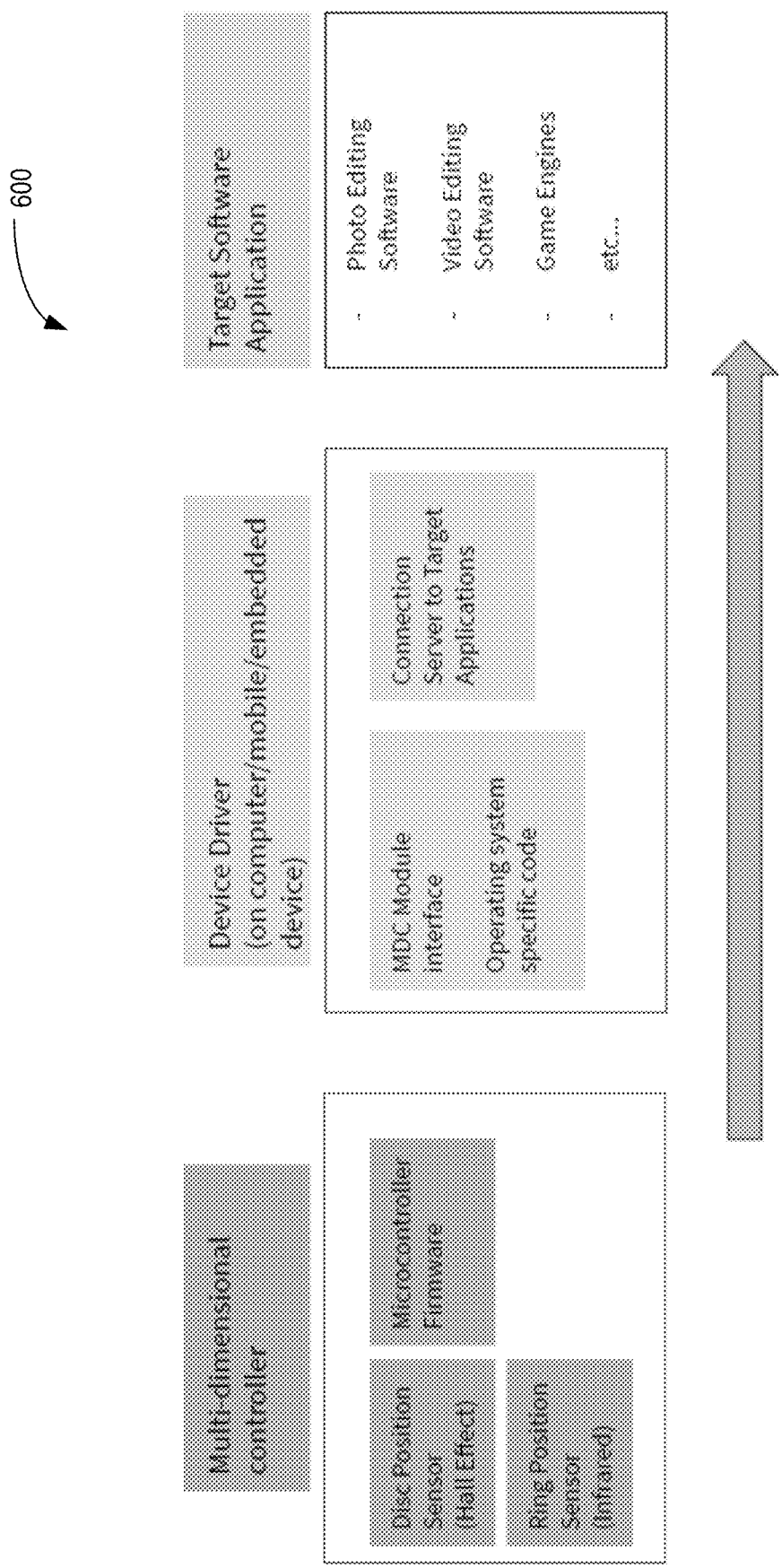
FIG. 6 shows a schematic overview of a process for calibrating and processing the signals from the multi-dimensional user interface controller apparatus in accordance with an embodiment.
Figure 7:
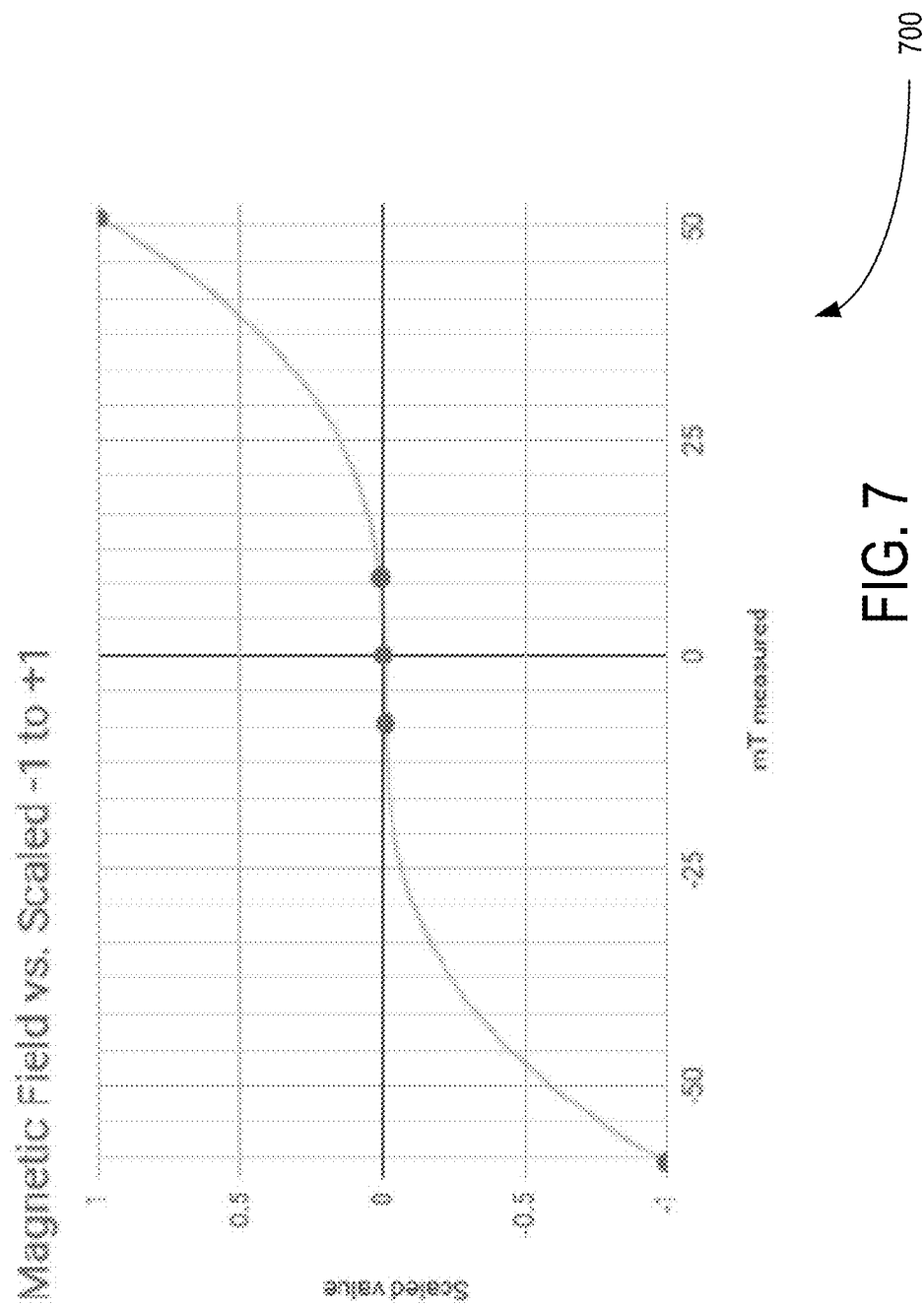
FIG. 7 shows an illustrative graph of a magnetic field plotted against a scaled value for mapping a sensor value to a set range.

Now referring to FIG. 6, shown is an illustrative graph of a magnetic field plotted against a scaled value for mapping a sensor value to a set range.

Using exactly five points: n1, n2, n3, n4, and n5, and using a Basic Theorem of Polynomial Interpolation, a polynomial of 3 degrees can be obtained. This is a sample interpolation for one of the axes. Since the disc 110 has X and Y axis, there would be two functions, f(mx) and f(my) which map the sensor value (mT) to set range.

This interpolation allows for moderate isolation of the axis, since v only starts increasing more rapidly as m gets higher, meaning that any small fluctuations/cross-effect between the axes can be filtered out.

Alternatively, a cubic spline monotone interpolation can be used, which makes f(m) a piecewise function in three parts, each a cubic polynomial.

Due to the nature of the interpolation, the Lagrange polynomial is more aggressive than the monotone cubic spline. This observation can be verified by plotting results of both interpolation and inspecting visually.

Notably, dead zone points are used to separate out X and Y axis, but this means that the formulas have an inherent bias towards actions that are on-axis with regards to the magnetic sensor. The interpolation is isolated to each variable, even though they are physically related. Now, a formula is obtained to interpolate it in X and Y directions, so it comes out as polar coordinate (multivariate magnitude and angle).

Both Polar and Cartesian coordinate systems may be appropriate in some applications depending on context. For actions where axis independence is important (i.e. temperature and tint in priority-directional mode), Cartesian coordinate system may be more appropriate as the variables directly correlate to X and Y axes. On the other hand, for actions where axis independence is less important but angular resolution is critical (i.e. changing view of an object in 3D space in omni-directional mode), polar coordinates may be preferred. The Application Programming Interface of the target application may determine which coordinate system is used. Translation of the polar and Cartesian coordinate systems may be done in the Microcontroller Firmware or Device Driver.

As an illustrative example, an App developer may wish to use the multi-dimensional controller to control a 3D space. He or she can decide polar (Rotation velocity magnitude+angle) or Cartesian is more suitable for the given application. Proper mechanical design is required to ensure the disc 110 tilts in the direction accurately.

Figure 8A:
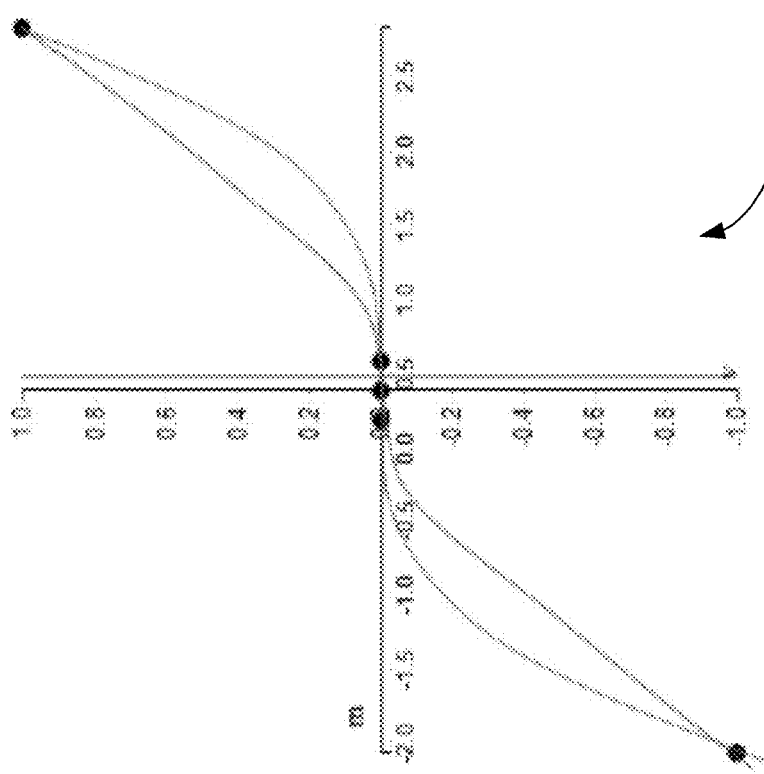
FIGS. 8A and 8B show an illustrative graph for mapping an input from the disc to a corresponding action or movement.
Figure 8B:
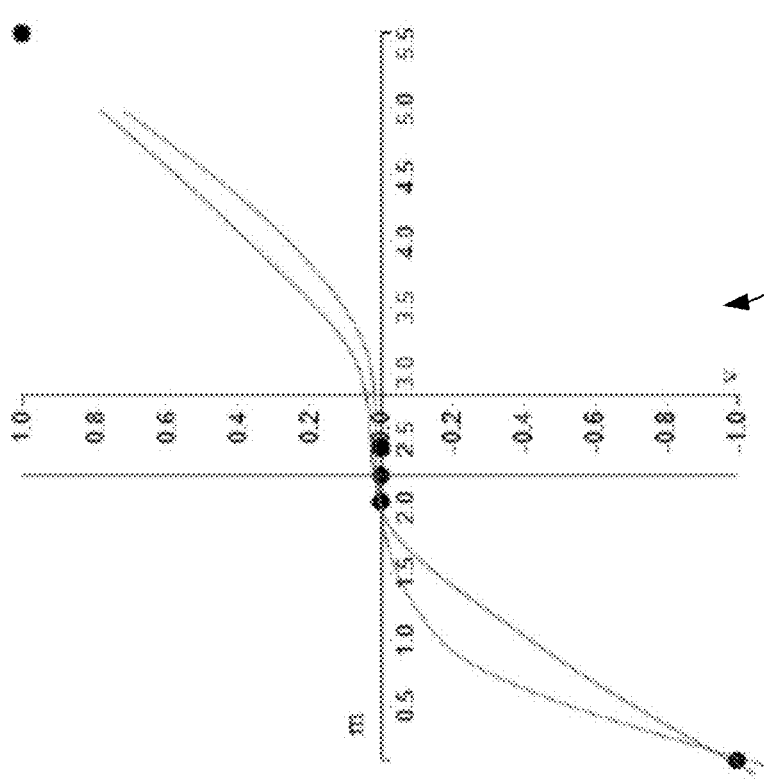

Now referring to FIG. 8, shown is an illustrative graph for mapping an input from the disc 110 to a corresponding action or movement. Notably, the three dead zone dots are off-center for the X axis. With improved mechanical design, ideally the three black dots should be centered in the crosshairs, and positive/negative domains of the functions should be symmetrical. The Y-axis plot is closer to ideal.

In determining whether to modify the target application variables directly, or to control the rate of change (step value) or the target application variables, it is noted that setting variables directly is simpler. The full range of action is mapped to set to the range of physical action on the disc 110. Controlling rate of change of a target application variable is more complicated as velocity control is introduced, so the idea of Control-Display gain from other inputs such as a PC mouse would be more applicable here.

In order for the mapping to work, it is desirable to have the five data points n1 through n5 for each axis and make the values n1 through n5 consistent.

In an embodiment, the controller software introduces a scaled value (v) −1 to +1 as the benchmark for the disc output. This means changing the Sensitivity directly modifies the response curve, rather than changing the rate at which events are fired.

Preferably, the relationship between scaled value (v) and perceived effect to the user should be 1:1. It's up to the target app itself to determine what this means. For most applications, scaled value (v) represents the rate of change for a target variable. Varying this scaled value can have significant effects on the target variable.

In an embodiment, the apparatus may undergo an auto-calibration process. For example, the following process may be used:

1. Start-up calibration
   a. Exponential Moving Average of the measurements are collected
   b. The deviation from the first measurement needs to be within a specified range, to ensure that the position of the disc is stable
   c. If these conditions are reached after a specified time (for example, 800 milliseconds), then the center point is chosen at the end of the sampling period using the measurements collected.
2. Ongoing "live" calibration
   a. If the disc is found to be at a stable position for an extended period of time (for example, 15 seconds), then the center point is chosen using this new stable position In an embodiment, the dead zone may be managed by taking into account the direction of travel. By taking into account the direction of the rate of change of the disc tilt, the dead zone can be minimized. When going from zero and increasing, the threshold is lower. When returning to center, the cut-off point is higher.

In an embodiment, the touch-sensitive nature of the disc may be used to determine user engagement with the disc, and therefore dead zone thresholds. In conjunction with the direction of disc travel, the dead zone can be minimized significantly, resulting in increased sensitivity and decreased minimum finger pressure required. FIG. 9 shows an illustrative graph of mapping sensitivity changes to the shape of a curve in accordance with an embodiment.

In an embodiment, Exponential Moving Average Filters may be used to average the rate of change over the time period. A short-range filter may be used to detect immediate trend of signal. A long-range filter may be used to detect changes over a longer period of time. This may provide "trends" for the signal. When both EMA filters are in agreement, means the data is stable and suitable for calibration. In addition, a hard-lock may help to ensure that during a candidate calibration time window, no measurement ever escapes the default dead zone. For the "live" dead zone, use the short-range filter to detect the immediate trend of the signal and change the threshold values appropriately.

In an embodiment, the Magnetic Field to Scaled Value function $v=f(m)$ may be embedded into firmware stored within the apparatus.

In another embodiment, Magnetic Field to Scaled Value function $v=f(m)$ for different user-selectable sensitivity settings can be represented by three cubic functions, and the controller software can generate the curves on a processor and store the exponents on the embedded device. This is possible when only a limited number of different sensitivities are required.

Figure 10:
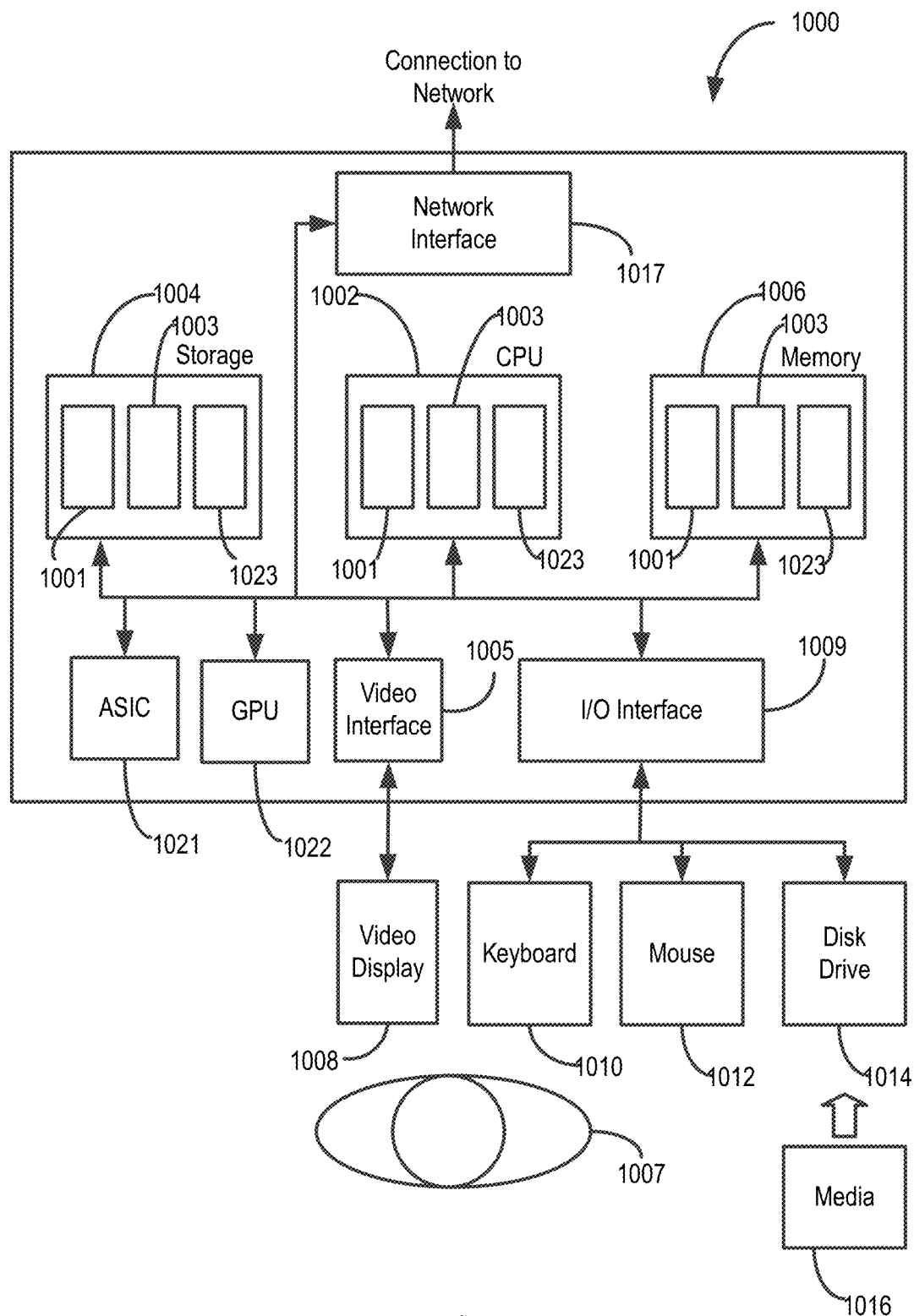
FIG. 10 shows a schematic block diagram of a computer which may provide an operating environment in accordance with various embodiments.

As shown in FIG. 10, a suitably configured processing device or computer device, and associated communications networks, devices, software and firmware may provide a platform for enabling one or more embodiments as described above. By way of example, FIG. 10 shows a generic computer device 1000 that may include a central processing unit ("CPU") 1002 connected to a storage unit 1004 and to a random access memory 1006. The CPU 1002 may process an operating system 1001, application program 1003, and data 1023. The operating system 1001, application program 1003, and data 1023 may be stored in storage unit 1004 and loaded into memory 1006, as may be required. Computer device 1000 may further include an Application Specific Integrated Circuit (ASIC) or a graphics processing unit (GPU) 1022 which is operatively connected to CPU 1002 and to memory 206 to offload intensive processing calculations from CPU 1002 and run these calculations in parallel with CPU 1002. An operator 1010 may interact with the computer device 1000 using a video display 1008 connected by a video interface 1005, and various input/ output devices such as a keyboard 1010, pointer 1012, and storage 1014 connected by an I/O interface 1009. In known manner, the pointer 1012 may be configured to control movement of a cursor or pointer icon in the video display 1008, and to operate various graphical user interface (GUI) controls appearing in the video display 1008. The computer device 1000 may form part of a network via a network interface 1011, allowing the computer device 1000 to communicate with other suitably configured data processing systems or circuits. A non-transitory medium 1016 may be used to store executable code embodying one or more embodiments of the present method on the generic computing device 1000.

Thus, in an aspect, there is provided a multi-dimensional user interface controller apparatus, comprising: a disc adapted to be tilted to control at least two-axes, and depressible in a third axis; and an outer ring surrounding the disc, the outer ring adapted to rotate about the disc to control a fourth axis; wherein, in use, the disc and the outer ring are controllable to provide at least four-axes of simultaneous control inputs.

In an embodiment, the multi-dimensional user interface controller apparatus further comprises a plurality of magnetic sensors to sense the tilt of the disc or a press on the disc.

In another embodiment, the disc further comprises a touch-sensitive top surface adapted to sense one or more fingers touching the surface.

In another embodiment, the rotational position of the outer ring is sensed by one or more optical, inductive, or other rotational sensors.

In another embodiment, the multi-dimensional user interface controller apparatus further comprises firmware or software for performing an auto-calibration for centering the disc and the outer ring.

In another embodiment, the multi-dimensional user interface controller apparatus further comprises firmware or software for performing an auto-calibration for determining the outer limits of the disc and mapping the tilt position of the disc to a desired output.

In another embodiment, the multi-dimensional user interface controller apparatus further comprises firmware or software performing an auto-calibration for determining the rotational position of the outer ring and mapping the rotational position of the outer ring to a desired output.

In another embodiment, the multi-dimensional user interface controller apparatus further comprises firmware or software for mapping the positions of the disc and the outer ring in multiple-axes to a desired output.

In another embodiment, the multi-dimensional user interface controller apparatus is further adapted to interface with controller software executable on a processing device to allow the apparatus to control third party software applications on the processing device.

In another embodiment, the multi-dimensional user interface controller apparatus is further adapted to provide a multi-dimensional input for simultaneously controlling multiple inputs.

In another aspect, there is provided a controller for a multi-dimensional user interface, comprising: a disc adapted to be tilted to control at least two-axes, and depressible in a third axis; and an outer ring surrounding the disc, the outer ring adapted to rotate about the disc to control a fourth axis; wherein, in use, the disc and the outer ring are controllable to provide at least four-axes of simultaneous control inputs.

In an embodiment, the controller further comprises a plurality of magnetic sensors to sense the tilt of the disc or a press on the disc.

In another embodiment, the disc further comprises a touch-sensitive top surface adapted to sense one or more fingers touching the surface.

In another embodiment, the rotational position of the outer ring is sensed by one or more optical, inductive, or other rotational sensors.

In another embodiment, the controller further comprises firmware or software for performing an auto-calibration for centering the disc and the outer ring.

In another embodiment, the controller further comprises firmware or software for performing an auto-calibration for determining the outer limits of the disc and mapping the tilt position of the disc to a desired output.

In another embodiment, the controller further comprises firmware or software for performing an auto-calibration for determining the rotational position of the outer ring and mapping the rotational position of the outer ring to a desired output.

In another embodiment, the controller further comprises firmware or software for mapping the positions of the disc and the outer ring in multiple-axes to a desired output.

In another embodiment, the controller is further adapted to interface with controller software executable on a processing device to allow the controller to control third party software applications on the processing device.

In another embodiment, the controller is further adapted to provide a multi-dimensional input for simultaneously controlling multiple inputs.

While illustrative embodiments have been described above by way of example, it will be appreciated that various changes and modifications may be made without departing from the scope of the invention, which is defined by the following claims.

The invention claimed is:

1. A multi-dimensional user interface controller apparatus, comprising:
a central disc adapted to be tilted to control at least two-axes, and depressible in a third axis; and
an outer ring surrounding the disc, the outer ring adapted to rotate independently about the disc to control a fourth axis;
wherein, in use, the disc and the outer ring are simultaneously controllable by an operator to provide at least four-axes of simultaneous control inputs.

2. The multi-dimensional user interface controller apparatus of claim 1, further comprising a plurality of magnetic sensors to sense the tilt of the disc or a press on the disc.

3. The multi-dimensional user interface controller apparatus of claim 1, wherein the disc further comprises a touch-sensitive top surface adapted to sense one or more fingers touching the surface.

4. The multi-dimensional user interface controller apparatus of claim 1, wherein the rotational position of the outer ring is sensed by one or more optical, inductive, or other rotational sensors.

5. The multi-dimensional user interface controller apparatus of claim 1, further comprising firmware or software for performing an auto-calibration for centering the disc and the outer ring.

6. The multi-dimensional user interface controller apparatus of claim 1, further comprising firmware or software for performing an auto-calibration for determining the outer limits of the disc and mapping the tilt position of the disc to a desired output.

7. The multi-dimensional user interface controller apparatus of claim 1, further comprising firmware or software for performing an auto-calibration for determining the rotational position of the outer ring and mapping the rotational position of the outer ring to a desired output.

8. The multi-dimensional user interface controller apparatus of claim 1, further comprising firmware or software for mapping the positions of the disc and the outer ring in multiple-axes to a desired output.

9. The multi-dimensional user interface controller apparatus of claim 1, wherein the apparatus is further adapted to interface with controller software executable on a processing device to allow the apparatus to control third party software applications on the processing device.

10. The multi-dimensional user interface controller apparatus of claim 9, wherein the apparatus is further adapted to provide a multi-dimensional input for simultaneously controlling multiple inputs.

11. A controller for a multi-dimensional user interface, comprising:
a central disc adapted to be tilted to control at least two-axes, and depressible in a third axis; and
an outer ring surrounding the disc, the outer ring adapted to rotate independently about the disc to control a fourth axis;
wherein, in use, the disc and the outer ring are simultaneously controllable by an operator to provide at least four-axes of simultaneous control inputs.

12. The controller of claim 11, further comprising a plurality of magnetic sensors to sense the tilt of the disc or a press on the disc.

13. The controller of claim 11, wherein the disc further comprises a touch-sensitive top surface adapted to sense one or more fingers touching the surface.

14. The controller of claim 11, wherein the rotational position of the outer ring is sensed by one or more optical, inductive, or other rotational sensors.

15. The controller of claim 11, further comprising firmware or software for performing an auto-calibration for centering the disc and the outer ring.

16. The controller of claim 11, further comprising firmware or software for performing an auto-calibration for determining the outer limits of the disc and mapping the tilt position of the disc to a desired output.

17. The controller of claim 11, further comprising firmware or software for performing an auto-calibration for determining the rotational position of the outer ring and mapping the rotational position of the outer ring to a desired output.

18. The controller of claim 11, further comprising firmware or software for mapping the positions of the disc and the outer ring in multiple-axes to a desired output.

19. The controller of claim 11, wherein the controller is further adapted to interface with controller software executable on a processing device to allow the controller to control third party software applications on the processing device.

20. The controller of claim 19, wherein the controller is further adapted to provide a multi-dimensional input for simultaneously controlling multiple inputs.

* * * * *